United States Patent [19]

Morrall et al.

[11] Patent Number: 5,256,168
[45] Date of Patent: * Oct. 26, 1993

[54] SULFOBENZOYL END-CAPPED ESTER OLIGOMERS USEFUL AS SOIL RELEASE AGENTS IN GRANULAR DETERGENT COMPOSITIONS

[75] Inventors: Stephen W. Morrall, Guilford, Ind.; Eugene P. Gosselink, Cincinnati, Ohio; Robert Y. Pan, Cincinnati, Ohio; Bala C. Nayar, Cincinnati, Ohio

[73] Assignee: The Procter & Gamble Company, Cincinnati, Ohio

[*] Notice: The portion of the term of this patent subsequent to Mar. 23, 2010 has been disclaimed.

[21] Appl. No.: 949,172

[22] Filed: Sep. 22, 1992

Related U.S. Application Data

[60] Division of Ser. No. 737,892, Jul. 25, 1991, Pat. No. 5,182,043, which is a continuation of Ser. No. 429,887, Oct. 31, 1989, abandoned.

[51] Int. Cl.$^5$ .................. C08G 63/688; C11D 3/34; C11D 3/37; C11D 17/06
[52] U.S. Cl. ........................ 8/137; 252/91; 252/174; 252/174.13; 252/174.23; 252/539; 252/558; 252/DIG. 2; 427/393.4; 528/295
[58] Field of Search ......... 252/90, 91, 174, 174.13, 252/174.23, 539, 558, DIG. 2; 427/393.4; 528/295; 560/14; 8/137

[56] References Cited

U.S. PATENT DOCUMENTS

| | | | |
|---|---|---|---|
| 3,416,952 | 12/1968 | McIntyre et al. | 117/118 |
| 3,546,008 | 12/1970 | Shields et al. | 117/138.8 |
| 3,563,942 | 2/1971 | Merberger | 260/29.2 |
| 3,639,352 | 2/1972 | Katsuura et al. | 528/293 |
| 3,712,873 | 1/1973 | Zenk | 260/29.2 |
| 3,734,874 | 5/1973 | Kibler et al. | 260/29.2 |
| 3,821,169 | 6/1974 | Duddey | 528/283 |
| 3,853,820 | 12/1974 | Varhon | 260/75 |
| 4,116,885 | 9/1978 | Derstadt et al. | 252/532 |
| 4,132,680 | 1/1979 | Nicol | 252/547 |
| 4,145,518 | 3/1979 | Morie et al. | 528/272 |
| 4,156,073 | 5/1979 | Login | 528/295 |
| 4,161,577 | 7/1979 | Price et al. | 528/295 |
| 4,215,026 | 7/1980 | Login | 260/292 |
| 4,238,531 | 12/1980 | Rudy et al. | 252/8.6 |
| 4,304,900 | 12/1981 | O'Neill | 528/290 |
| 4,304,901 | 12/1981 | O'Neill et al. | 528/290 |
| 4,427,557 | 1/1984 | Stockburger | 252/8.7 |
| 4,525,524 | 6/1985 | Tung et al. | 524/601 |
| 4,554,328 | 11/1985 | Sinker et al. | 525/437 |
| 4,661,267 | 4/1987 | Dekker et al. | 252/8.8 |
| 4,702,857 | 10/1987 | Gosselink | 252/8.6 |
| 4,711,730 | 12/1987 | Gosselink et al. | 252/8.75 |
| 4,713,194 | 12/1987 | Gosselink | 252/174.23 |
| 4,721,580 | 1/1988 | Gosselink | 252/90 |
| 4,738,787 | 4/1988 | O'Lenick et al. | 252/8.8 |
| 4,759,876 | 7/1988 | Crossin et al. | 252/551 |
| 4,764,289 | 8/1988 | Trinh | 252/8.6 |
| 4,818,569 | 4/1989 | Trinh et al. | 427/242 |
| 4,877,896 | 10/1989 | Maldonado et al. | 560/14 |
| 4,976,879 | 12/1990 | Maldonado et al. | 252/8.7 |
| 5,196,133 | 3/1993 | Leslie | 252/95 |

FOREIGN PATENT DOCUMENTS

| | | |
|---|---|---|
| 1100262 | 5/1981 | Canada . |
| 185427 | 6/1986 | European Pat. Off. . |
| 194127 | 9/1986 | European Pat. Off. . |
| 199403 | 10/1986 | European Pat. Off. . |
| 56-98230 | 8/1981 | Japan . |
| 57-25326 | 2/1982 | Japan . |
| 59-30967 | 2/1984 | Japan . |
| 60-250028 | 10/1985 | Japan . |
| 61-275422 | 12/1986 | Japan . |
| 1161668 | 8/1969 | United Kingdom . |
| 2172608 | 9/1986 | United Kingdom . |

OTHER PUBLICATIONS

Handbook of Fiber Science and Technology, Marcel Dekker, New York, N.Y., 1984, volume II, Part B, Chap. 3, entitled "Soil Release Finishes".
Polyesters and their Applications, Bjorksten et al., Reinhold, 1956, pp. 156–173, 284 and 285, 322 and 323, 328 and 329.
Ponnusamy et al., Makromol. Chem. 184, 1279–1284, 1983.
Zimmerman et al., Faserforsch, Textiltech, 18(11), 536–7 As the Abstract CA 68(2):3741(g).
Pending U.S. Ser. No. 07/429,896, Leslie et al., Filed Oct. 31, 1989; 07/713,642, filed Jun. 10, 1991.

Primary Examiner—Dennis Albrecht
Attorney, Agent, or Firm—Ronald L. Hemingway; Donald E. Hasse

[57] ABSTRACT

Anionic, sulfobenzoyl end-capped esters useful as soil release agents in granular detergent compositions. The terephthalate esters contain oxyethyleneoxy and oxy-1,2-propyleneoxy units, and are substantially amorphous in form.

14 Claims, No Drawings

SULFOBENZOYL END-CAPPED ESTER OLIGOMERS USEFUL AS SOIL RELEASE AGENTS IN GRANULAR DETERGENT COMPOSITIONS

This is a division of application Ser. No. 737,892 filed on Jul. 25, 1991 (now U.S. Pat. No. 5,182,043 issued Jan. 26, 1993), which is a continuation of Ser. No. 429,887, filed Oct. 31, 1989, now abandoned.

TECHNICAL FIELD

The present invention relates to oligomeric or low molecular weight polymeric ester compositions which are substantially amorphous in form and which are useful as soil release agents in granular laundry detergent compositions.

BACKGROUND OF THE INVENTION

A substantial proportion of synthetic fabrics now in use are copolymers of ethylene glycol and terephthalic acid, sold under trade names which include DACRON, FORTREL, KODEL and BLUE C POLYESTER. The removal of oily soil and oily stains from the surface of such fabrics is well recognized to be technically difficult to achieve using laundry compositions of the type most generally accessible to consumers.

Substances which have been suggested for use in consumer products as soil release agents include polymers which contain ethylene terephthalate segments randomly interspersed with polyethylene glycol segments. See, for example, U.S. Pat. No. 3,962,152, Nicol et al, issued Jun. 8, 1976. A soil release polyester of this type, commercially known as MILEASE T, is further disclosed in U.S. Pat. No. 4,116,885, Derstadt et al, issued Sep. 7, 1978. Other commercial variants are sold as PERMALOSE, ZELCON and ALKARIL products (see, for example, Canadian Patent 1,100,262, Becker et al, issued May 5, 1981; U.S. Pat. No. 4,238,531, Rudy et al, issued Dec. 9, 1980; and British Patent Application 2,172,608, Crossin, published Sep. 24, 1986). Commercial suppliers of soil release polyesters include ICI, duPont and Alkaril (formerly Quaker Chemical Co.).

Soil release compositions used in industrial textile treatment applications are well-known. Application of such compositions is under controlled conditions and is free from the formulation constraints encountered in the detergent arts. Padding and heat curing, in the absence of high levels of detergent chemicals, are illustrative of the processes used. Polyesters have successfully been used for industrial soil release treatments of polyester surfaces, but recent trends are toward rather expensive fluorochemical treatments.

The development of economical, product-stable and formulation-compatible soil release agents for consumer product compositions is not straightforward. In contrast with the simple and controlled environments in which industrial textile treatment agents are generally used, soil release agents in consumer laundry products will usually be exposed to various detersive ingredients, such as anionic surfactants, alkaline builders and the like. Such chemicals may reduce the effectiveness of soil release agents, for example, by preventing their deposition on fabrics. The soil release agents may, reciprocally, reduce the laundry benefits of detersive ingredients, for example, by interfering with the action of surfactants, optical brighteners, antistatic agents or softeners, all of which are commonly present in modern detergent compositions. In a "thru-the-wash" mode, it is especially important that no formulation ingredient, including the soil release agent, should promote the redeposition of suspended soils in the laundry liquor; this would dull the appearance of the laundered fabrics.

Arguably, the most difficult of consumer laundry products, for the purpose of incorporating soil release agents, are granular detergent compositions. Compatibility requirements of soil release agents, especially with the alkaline, anionic detergent environments commonly present in such detergent compositions, provide a substantial technical challenge. An additional challenge is incorporating the soil release agents in the appropriate physical form for stability and effective delivery to the laundering solution.

Novel sulfoaroyl end-capped ester oligomers useful as soil release agents in detergent compositions and fabric-conditioning articles are disclosed in European Patent Application 0311342, Maldonado, Trinh and Gosselink, published Apr. 12, 1989.

The present invention relates to selected soil release agents of the type disclosed in EPA 0311342, which are substantially amorphous in form and are especially useful in granular detergent compositions.

It is an object of the present invention to provide compositions which can be used as effective and product compatible soil release agents in granular detergent compositions.

It is a further object of the invention to provide oligomeric or low molecular weight polymeric esters in a physical (amorphous) form useful as soil release agents in granular detergent compositions.

These and other objects are secured herein, as will be seen from the following disclosure.

SUMMARY OF THE INVENTION

The present invention encompasses oligomeric or low molecular weight polymeric, substantially linear, sulfobenzoyl endcapped esters comprising oxy-1,2-alkyleneoxy units and terephthaloyl units, in a mole ratio of said oxy-1,2-alkyleneoxy units to said terephthaloyl units ranging from about 2:1 to about 1.1:1. (Mixtures of such esters with reaction by-products and the like are useful as fabric soil release agents herein when at least 50 mole %, preferably at least 60 mole % of the end-capping groups are sulfobenzoyl groups.) The esters herein are of relatively low molecular weight (i.e., outside the range of fiber-forming polyesters), typically with averages ranging from about 650 to about 2500.

The essential end-capping units herein are anionic hydrophiles, connected to the esters by means of benzoyl groups. The anion source is a sulfonated group, i.e., the end-capping units are sulfobenzoyl units of the formula $(MO_3S)(C_6H_4)C(O)-$, wherein M is sodium.

The essential oxy-1,2-alkyleneoxy units of the esters herein are (a) oxy-1,2-propyleneoxy units of the formula $-OCH(R^a)CH(R^b)O-$, wherein $R^a$ and $R^b$ are selected so that in each of said units, one of said groups is H and the other is $CH_3$, and (b) oxyethyleneoxy units of the formula $-OCH_2CH_2O-$. The (a) units are believed to provide a sufficiently unsymmetrical character required for stability of the desired amorphous physical form, whereas the (b) units are believed to provide sufficient symmetry for soil release activity. The required balance between the unsymmetrical and symmetrical character is obtained when the mole ratio of units (b) to (a) is in the range from about 15:1 to about 2.5:1.

It is also possible, optionally, to incorporate minor amounts (e.g. less than 5%, preferably less than 2%, by weight) of additional hydrophilic units such as di- or tri-(oxyethylene)oxy units, into the esters.

Thus, esters herein comprise, per mole of said ester,
i) from about 1 to about 2 moles of sulfobenzoyl end-capping units of the formula $(MO_3S)(C_6H_4)C(O)-$ wherein M is sodium;
ii) from about 2 to about 10 moles of mixtures of oxy-1,2-propyleneoxy units and oxyethyleneoxy units; and
iii) from about 1 to about 9 moles of terephthaloyl units.

Preferably, not more than about 0.15 mole fraction of said sulfobenzoyl end-capping units in the esters are in para- form. Most highly preferred are esters wherein said sulfobenzoyl end-capping units are essentially in ortho- or meta- form. Preferred end-capped esters herein are essentially in the doubly end-capped form, comprising about 2 moles of said sulfobenzoyl end-capping units per mole of said ester.

The ester "backbone" of the present compositions, by definition, comprises all the units other than the end-capping units; all the units incorporated into the esters being interconnected by means of ester bonds. The ester "backbone" comprises terephthaloyl units, oxyethyleneoxy units, and oxy-1, 2-propyleneoxy units, the mole ratio of the latter two types of units ranging from about 15:1 to about 2.5:1.

Preferred compositions provided by the invention comprise from about 25% to about 100% by weight of ester having the empirical formula $(CAP)_x(EG/PG)_y(T)_z$; wherein (CAP) represents the sodium salt form of said sulfobenzoyl end-capping units i); (EG/PG) represents said oxyethyleneoxy and oxy-1,2-propyleneoxy units ii); (T) represents said terephthaloyl units iii); x is from about 1 to 2; y is from about 2.25 to about 7; z is from about 1.25 to about 6; wherein x, y and z represent the average number of moles of the corresponding units per mole of said ester. More preferably, the oxyethyleneoxy:oxy-1,2-propyleneoxy mole ratio ranges from about 3:1 to about 10:1 (more preferably from about 4:1 to about 8:1); x is about 2, y is from about 2.25 to about 5.5, and z is from about 1.25 to about 4.5. Most preferably, these ester compositions comprise at least 50% by weight of said ester molecules (oligomers) having average molecular weights ranging from about 700 to about 2000, preferably from about 800 to about 1500.

In the process aspect of the invention, the invention encompasses the preparation of the aforesaid $(CAP)_x$-$(EG/PG)_y(T)_z$ linear esters by a process most preferably comprising reacting dimethyl terephthalate, ethylene glycol, 1,2-propylene glycol and a compound selected from the group consisting of the monosodium salt of sulfobenzoic acid (or its $C_1$-$C_4$ alkyl carboxylate esters), in the presence of at least one conventional transesterification catalyst. The resulting water-soluble or dispersible ester mixtures are used as fabric soil release materials, the best results being achieved with, but not being limited to, polyester fabrics. Another highly preferred ester mixture is provided by a process which most preferably comprises reacting dimethyl terephthalate, 1,2-propylene glycol, ethylene glycol and the monosodium salt of sulfobenzoic acid, in the presence of at least one conventional transesterification catalyst.

All percentages, parts and ratios herein are given, unless expressly otherwise indicated, on a weight basis.

DETAILED DESCRIPTION OF THE INVENTION

The present invention encompasses ester compositions suitable for use in granular detergent compositions. The esters are characterized by certain essential end-capping and backbone units, all in particular proportions and having structural and physical arrangements as described hereinafter.

The esters herein can be simply characterized as oligomers or relatively low molecular weight polymers which comprise a substantially linear ester "backbone" and end-capping units which are sulfobenzoyl. Proper selection of the structural units which comprise the ester backbone and use of sufficient amounts of the sulfobenzoyl end-capping units results in the desired soil-release properties of these materials.

Oligomeric/Polymeric Esters—It is to be understood that the compositions herein are not resinous, high molecular weight, macromolecular or fiber-forming polyesters, but instead are relatively low molecular weight and contain species more appropriately described as oligomers rather than as polymers. Ester compositions herein have average molecular weights ranging from about 650 to about 2500, preferably from about 800 to about 1500. Accordingly, the compositions of this invention are referred to as "oligomeric or polymeric esters" rather than "polyester" in the colloquially used sense of that term as commonly used to denote high polymers such as fibrous polyesters.

Molecular Geometry—The esters of the invention are all "substantially linear", in the sense that they are not significantly branched or crosslinked by virtue of the incorporation into their structure of units having more than two ester-bond forming sites. (For a typical example of polyester branching or crosslinking of the type excluded in defining esters of the present invention, see Sinker et al, U.S. Pat. No. 4,554,328, issued Nov. 19, 1985.) Furthermore, no cyclic esters are essential for the purposes of the invention, but they may be present in the compositions at low levels as a result of side-reactions during ester synthesis. Preferably, cyclic esters will not exceed about 2% by weight of the compositions; most preferably, they will be entirely absent from the compositions.

Contrasting with the above, the term "substantially linear" as applied to the esters herein does, however, expressly encompass materials which contain side-chains which are unreactive in ester-forming or transesterification reactions. Thus, oxy-1,2-propyleneoxy units are of an unsymmetrically substituted type essential in the present invention; their methyl groups do not constitute what is conventionally regarded as "branching" in polymer technology (see Odian, Principles of Polymerization, Wiley, N.Y., 1981, pages 18-19, with which the present definitions are fully consistent), and are unreactive in ester-forming reactions.

Molecular Units—The esters of this invention comprise repeating backbone units, and end-capping units. To briefly illustrate, molecules of the preferred ester are comprised of three kinds of essential units, namely
i) sulfobenzoyl end-capping units of the formula $(MO_3S)(C_6H_4)C(O)-$ wherein M is sodium;
ii) mixtures of oxy-1,2-propyleneoxy units, i.e., $-OCH(CH_3)CH_2O-$ or $-OCH_2CH(CH_3)O-$, with oxyethyleneoxy units, i.e., $-OCH_2CH_2O-$; and iii) terephthaloyl units, i.e., —(O)CC₆H₄C(O)—; note that as generally used herein, the latter formula is indicative of a

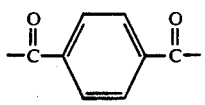

unit.

The following structure illustrates a doubly end-capped ester molecule (termed a "hybrid backbone" ester molecule herein) falling within the foregoing embodiments where units ii) are a mixture of oxyethyleneoxy and oxy-1,2-propyleneoxy units in a 4:1 mole ratio (on average, in ester compositions as a whole in contrast to individual molecules such as illustrated here, ratios ranging from about 15:1 to about 2.5, preferably from about 10:1 to about 3:1, more preferably from about 8:1 to about 4:1, are the most highly preferred):

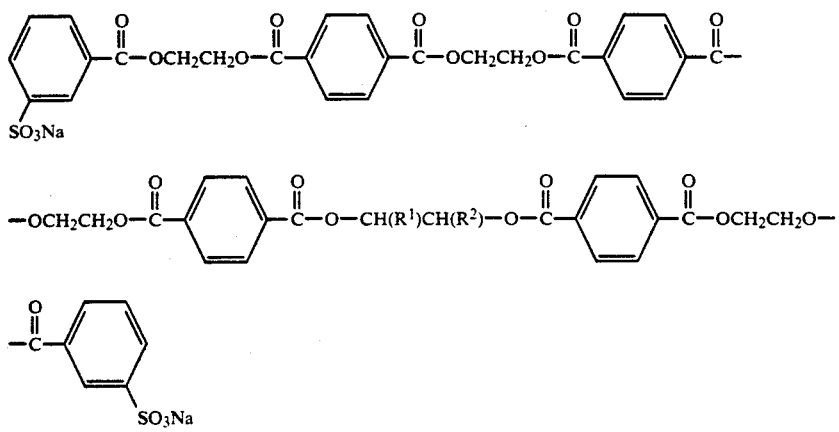

In the above structure, $R^1$ and $R^2$ are selected so that $R^1$ or $R^2$ is randomly —CH₃, with the second R group of each —OCH($R^1$)CH($R^2$)O— unit being —H.

It will be seen from the above disclosure that the units essential for the invention are individually art-recognized. Despite this fact, the new arrangement of units upon which the invention is based, leads to ester molecules and ester-containing compositions exceptionally useful in the field of the present invention.

In the context of the structures of ester molecules disclosed herein, it should be recognized that the present invention encompasses not only the arrangement of units at the molecular level, but also in each instance the gross mixtures of esters which result from the reaction schemes herein, and which have the desired range of composition and properties. Accordingly, the "esters of the invention" is a term which encompasses the doubly end-capped compounds disclosed herein, mixtures thereof, and mixtures of said end-capped materials which may unavoidably contain some singly end-capped and non-capped species, although levels of the latter will be zero or at a minimum in all of the highly preferred compositions.

Thus, when referring simply to an "ester" herein, it is furthermore intended to refer, by definition, collectively to the mixture of ester molecules resulting from any single preparation.

Ester Backbone—To further illustrate this point, consider esters of the invention comprised exclusively of the essential terephthaloyl units, mixtures of oxyethyleneoxy and oxy-1,2-propyleneoxy units, and the sulfobenzoyl end-capping units. In molecules of this ester, the oxyalkyleneoxy and terephthaloyl units are connected in alternation, forming the ester backbone.

Groups at the Termini of the Ester Backbone

Any ester molecules which are present in compositions of the invention which are not fully, i.e., doubly, end-capped by the end-capping units, must terminate with units which are not sulfobenzoyl end-capping units. These termini will be hydroxyl groups or other groups attributable to the unit-forming reactant. For example, units such as —OCH₂CH₂OH, —OCH(CH₃)CH₂OH or —OCH₂CH(CH₃)OH, i.e., one oxy-1,2-propyleneoxy unit in a chain terminal position to which is attached —H forming a hydroxyl group, are suitable. In other examples which may be constructed, units such as —(O)CC₆H₅ (from unsulfonated benzoic acid), —(O)CC₆H₄C(O)—OCH₃ or —(O)CC₆H₄C(O)—OH may be found in terminal positions. All the most highly preferred ester molecules herein will, however, as indicated above, have two sulfobenzoyl end-capping units and no residual units occupying terminal positions.

Symmetry

It is to be appreciated that in the above formulas the oxy-1,2-propyleneoxy units can have their methyl groups randomly incorporated with one of the adjacent —CH₂— hydrogen atoms, thereby lowering the symmetry of the ester chain. Thus, for example, the first oxy-1,2-propyleneoxy unit in the formula can be depicted as having the —OCH₂CH(CH₃)O— orientation, while the second such unit may have the opposite, —OCH(CH₃)CH₂O— orientation. Carbon atoms in the oxy-1,2-propylene units, to which atoms the methyl groups are attached, are furthermore asymmetric, i.e., chiral; they have four nonequivalent chemical entities attached.

Fabric Substantivity and Formulability of the Esters

The ester backbone provides fabric substantivity of the compositions herein. In a preferred embodiment, alternating terephthaloyl and oxyalkyleneoxy units form an ester backbone which is not only fabric substantive, but also very compatible with consumer fabric care ingredients.

It should also be noted that the essential non-charged aryldicarbonyl units herein need not exclusively be terephthaloyl units, provided that the polyester-fabric-substantivity of the ester is not harmed to a significant extent. Thus, for example, minor amounts of isomeric non-charged dicarbonyl units, such as isophthaloyl or the like, are acceptable for incorporation into the esters.

End-Capping Units

The end-capping units used in the esters of the present invention are sulfobenzoyl groups of the formula $(MO_3S)(C_6H_4)C(O)-$, where M is sodium. These end-cap units provide anionic charged sites when the esters are dispersed in aqueous media, such as a laundry liquor or rinse bath. The end-caps serve to assist transport in aqueous media, as well as to provide hydrophilic sites on the ester molecules which are located for maximum effectiveness of the esters as soil release agents.

The sulfobenzoyl end-capping units can exist as isomers with the sulfonate substituent at the ortho-, meta- or para- positions with respect to the carbonyl substituent. Sulfobenzoyl isomer mixtures and pure metasulfobenzoyl substituents are among the most highly preferred end-capping units, whereas pure para-isomers are significantly less desirable. It is highly preferred that not more than about 0.15 mole fraction of the sulfobenzoyl end-capping units be in para-form; most preferably meta-sulfobenzoyl end-capping units should be used. Of the highly preferred forms, industrially prepared sulfobenzoyl isomer mixtures having controlled para isomer content are most economical. It is also noted that such isomer mixtures may contain up to 0.1 mole fraction of benzoic acid or similar unsulfonated material, without ill effects; higher levels of unsulfonated material are in certain instances more likely to be tolerated, e.g., when the molecular weights of the esters are low.

On a mole basis, the compositions herein will preferably comprise from about one to about two moles of the sulfobenzoyl end-capping units per mole of the ester. Most preferably, the esters are doubly end-capped; i.e., there will be two moles of end-capping units present per mole of the esters. From the viewpoint of weight composition, it will be clear that the contribution of end-capping units to the molecular weight of the esters will decrease as the molecular weight of the ester backbone increases.

In addition to the above, there should be at least 12.5 mole percent, preferably from about 40 to 100 mole percent, more preferably from about 50 to 80 mole percent, of sulfobenzoyl units relative to the number of terephthaloyl units.

The molar ratio of oxyalkyleneoxy units to terephthaloyl units should also be from about 2:1 to about 1.1:1, preferably from about 1.5:1 to about 1.2:1, more preferably from about 1.4:1 to about 1.25:1.

In addition to the above chemical definition, the soil release esters of the present invention must also be substantially amorphous in character at the time they are introduced into the laundering solution. "Substantially amorphous" as defined herein indicates that esters in accordance with the invention have a heat of fusion of 15 J/g (Joules per gram) or less, preferably less than about 9 J/g, more preferably less than about 3 J/g, as measured by Differential Scanning Calorimetry (DSC). This corresponds with a content of crystalline material of less than 16%, preferably less than 10%, more preferably 3% or less, by weight. (Such materials are thus at least about 84%, preferably at least about 90%, more preferably at least about 97%, by weight in amorphous form.) The heat of fusion differentiates the esters from highly crystalline ester forms which, though they may have the same or similar chemical composition, are surprisingly deficient as soil release agents in the present detergent compositions. Typically, unsuitable crystalline forms of the ester have heats of fusion of 28 J/g, or higher: heats of fusion of up to about 93 J/g are possible for certain very highly crystalline samples.

While not intending to be limited by theory, it is believed that these soil release esters function by dissolving in the laundering solution, adsorbing onto fabric surfaces, particularly low polarity surfaces such as in typical polyester fabrics, and effecting a surface modification. The modified surfaces are believed to be more polar and hydrophilic, and thus have reduced affinity for oily soils. This facilitates the removal of oily soils during the laundering operation. In contrast, when the esters are not in the substantially amorphous form, they are believed incapable of effective dissolution and transport from the laundering solution to the fabric surface.

A preferred method for producing the esters in the substantially amorphous state is to rapidly cool freshly made, hot melts of the ester compositions herein to room temperature with substantially no water present. "Rapid" cooling generally involves reducing the temperature of the molten material from 200° C. or above (preferably 220° C.–230° C.) to storage temperatures generally below about 78° C. over one hour. Most preferably, the cooling rate for such quenching should preferably be greater, e.g., about 10° C./min, more preferably about 60° C./min, or more. Alternatively, an ester composition which has obtained the undesired crystalline state can be converted to the amorphous form by remelting (220°–240° C.) and subsequent rapid cooling. The substantially amorphous ester should be stored at a temperature generally below about 78° C., since that temperature corresponds with the beginning of its glass transition.

To maintain the desired amorphous form of soil release esters, it is necessary to limit the access of free water to the material until it is introduced to the laundering solution. Storage of the material in the presence of water or humid atmosphere will result in an ordering of the material into the unsuitable crystallized form. Restricting exposure of the soil release esters to free water can be accomplished, for example, by dry mixing with a desiccant (such as a granular detergent herein), enclosure in a container which acts as a moisture barrier, decreasing relative surface area, and/or coating with a protective layer, such as with thin films (approximately 10 wt. %) comprised primarily of maltrin or Methocel E.

The soil release esters herein are believed to spontaneously rearrange, when sufficient molecular mobility is provided by heat or solvents, from an amorphous form into a crystalline form which is insoluble in the laundering solution. This "inherent" crystallinity is controlled by the chemical factors described above. Rapid cooling and exclusion from water maintain the amorphous form of the material which is soluble in the laundering solution. It is believed that the ability of the soil release esters to then spontaneously rearrange to the insoluble ordered form on fabric surfaces significantly enhances its deposition from the laundering solution, and consequently soil release performance.

In light of the foregoing observations, it is important to have a good method for distinguishing amorphous form ester and for quantifying contamination of the amorphous form with the undesired crystalline form. Differential Scanning Calorimetry (DSC) provides such a method.

Any convenient DSC equipment suitable for measuring glass transition temperatures in polyesters can be used. Such equipment is illustrated by a Mettler TA3000 Thermal Analysis System (Mettler Instrument Corp., Princeton Rd., Hightstown, N.J. 08520). The system comprises a TC10A TA Processor, a DSC30 Calorimeter with Liquid Nitrogen Cooling Accesories and a TG50 Thermobalance. The temperature calibration for DSC is done in the art-known manner using indium, lead and zinc standards. The heat flow is calibrated using indium and the heat capacity using sapphire.

Samples suitable for scanning can be made by sealing aliquots (approx. 16 mg.) of ester (particle size average from 250 to 425 micron) in aluminum pans.

In general, the analysis method involves scanning from minus 20° C. to plus 250° C. at a 10° C./min heating rate. Integrations of the heat exchange peaks (enthalpy of transition) are done using the built-in program in the TC10A Processor.

It is found that the ester in amorphous form shows only one sharp glass transition, between 78° C. and 128° C.: Tg, the glass transition temperature, is at around 95° C. Both the glass transition temperature range and $T_g$ are in a range which is in good agreement with that expected from a poly(ethylene terephthalate) modified to have anionic character (sulfobenzoyl end-caps). No other thermal transitions are observed.

In contrast, the crystalline form of the ester generally has more than one endothermic region; typically, there are two endothermic regions, but depending on the thermal history of the sample, three may be observed. For ester isothermally crystallized at temperatures below 180° C., two melting endotherms are invariably found. One is located between 176° C. and 185° C. and the other is about 15° C. higher than the temperature at which the isothermal crystallization is carried out. When the crystalline ester is the product of crystallizing at crystallization temperatures above 180° C., only one melting endotherm is observed: this is located at around 215° C. Such high temperature endotherm data characterizes ester materials unsuitable for use herein.

For DSC analysis of unsuitable ester samples the crystallinity of which has been induced by treatment with water, the sample is first dried by preheating to 105° C. for 3 hours before measurement. The DSC trace then consists of two melting endotherms, a major one at 215° C. and a minor one at 185° C.

When DSC analysis is carried out on ester samples containing trace water, without drying, two glass transitons of the ester are commonly observed. The additional glass transition of the ester is typically seen 30° C. or more below any glass transition temperature cited above. Two glass transitions are common for such samples. Without being bound by theory, the result suggests that the ester particle surface may be selectively affected, with crystallization occurring there but not in the internal portion of the sample. Although it is possible to use samples of esters having some limited coating with crystalline-form esters in the instant detergent compositions as soil release agents, the use of such samples is preferably avoided.

To further characterize and distinguish the amorphous and crystalline forms of the ester, a simplified two-phase model can be applied, on the understanding that only the amorphous content is expected to contribute to the glass transition. The amorphous content of semicrystalline samples can then be obtained by comparing their heat capacity increase at glass transition with the corresponding heat capacity increase of the amorphous ester oligomer. Heat of fusion for 100% crystalline ester is estimated to be about 93 J/g (Joules per gram) from extrapolation of the heat of fusions of semicrystalline samples to zero amorphous content. Crystallinity for any future samples can then be predicted based on the ratio between measured heat of fusion and this empirical value.

The crystallization kinetics of the ester depend not only on history of exposure to heat and/or humidly but also to some extent on the backbone length, oxyethyleneoxy/oxpropyleneoxy ratio, counterions and capping groups. Thus, when the structure of the ester is varied outside the scope of the instant invention, for example by extending the length of the backbone or by overly increasing the oxyethyleneoxy/oxypropyleneoxy ratio, the stability of the amorphous form of the ester is diminished, crystallization is favored, and good soil release performance is not, as a matter of practicality, realizable.

The crystallization kinetics also increase significantly when the cation associated with the sulfonated groups is changed from sodium to potassium. Therefore sodium is highly preferred over potassium as cation for use herein. Oligomeric esters outside the scope of the invention or occurring in less preferred embodiments and characterized in that they comprise end-capping groups less rigid than sulfobenzoyl (for example anionically terminated aliphatic groups) can have faster crystallization rate and this can lead to inferior soil release characteristics by virtue of lowered stability of the ester to crystallization in a solid-form detergent matrix.

Method for Making Sulfoaroyl End-Capped Esters

The ester compositions of the present invention can be prepared using any one or combination of several alternative general reaction types, each being well-known in the art. Many different starting materials and diverse, well-known experimental and analytical techniques are useful for the syntheses. Types of synthetic and analytical methods useful herein are well illustrated in European Patent Application 185,427, Gosselink, published Jun. 25, 1986, and in Odian, *Principles of Polymerization*, Wiley, N.Y., 1981, both of which are incorporated herein by reference. Chapter 2.8 of the Odian reference, entitled "Process Conditions", pp 102-105, focuses on the synthesis of poly(ethylene terephthalate); it should be noted that the synthesis temperatures reported in Odian (260°-290° C.) are unsuitably high for general use herein unless exposure times are short; also that the use of two types of catalyst, the first being deactivated by means of a phosphorus compound before use of the second, is not necessary herein. Temperature requirements and catalysts for use herein are further discussed hereinafter.

Mechanistically, the suitable general reaction types for preparing esters of the invention include those classifiable as:

1. alcoholysis of acyl halides;
2. esterification of organic acids;
3. alcoholysis of esters (transesterification); and
4. reaction of alkylene carbonates with organic acids.

Of the above, reaction types 2-4 are highly preferred since they render unnecessary the use of expensive solvents and halogenated reactants. Reaction types 2 and 3 are especially preferred as being the most economical.

Suitable starting materials or reactants for making the esters of this invention are any reactants (especially esterifiable or transesterifiable reactants) which are capable of combining in accordance with the reaction types 1-4, or combinations thereof, to provide esters having the correct proportions of all the above-specified units (i) to (iii) of the esters.

Such reactants can be categorized as "simple" reactants, i.e., those which are singly capable of providing only one kind of unit necessary for making the esters; or as derivatives of the simple reactants which singly contain two or more different types of unit necessary for making the esters. Illustrative of the simple kind of reactant is dimethyl terephthalate, which can provide only terephthaloyl units. In contrast, bis(2-hydroxypropyl)terephthalate is a reactant which can be prepared from dimethyl terephthalate and 1,2- propylene glycol, and which can desirably be used to provide two kinds of unit, viz. oxy-1,2-propyleneoxy and terephthaloyl, for making the esters herein. Similarly, compounds such as

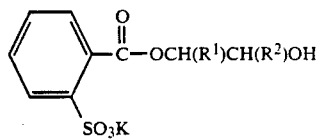 (I)

and

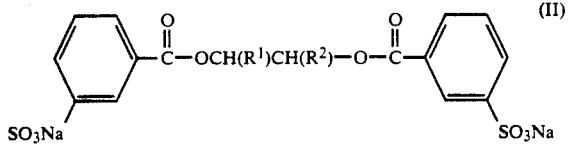 (II)

wherein $R^1$, $R^2$=H or $CH_3$ (provided that when $R^1$=H, $R^2$=$CH_3$ and when $R^2$=H, $R^1$=$CH_3$), could be used to provide both endcapping (sulfobenzoyl) and oxy-1,2-propyleneoxy units. In principle it is also possible to use oligoesters, or polyesters such as poly(1,2-propylene terephthalate), as reactants herein, and to conduct transesterification with a view to incorporation of end-capping units while decreasing molecular weight, rather than following the more highly preferred procedure of making the esters from the simplest reactants in a process involving molecular weight increase (to the limited extent provided for by the invention) and end-capping.

Since "simple" reactants are those which will most preferably and conveniently be used, it is useful to illustrate this kind of reactant in more detail. Thus, aromatic sulfocarboxylates, in acid (generally neutralized to place the sulfonate group in salt form prior to continuing synthesis) or carboxylate-lower (e.g. $C_1$-$C_4$) alkyl ester forms such as (III), can be used as the source of the essential end-capping units herein.

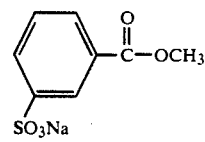 (III)

An additional example of such reactants is m-sulfobenzoic acid monosodium salt (preferred). Mixtures of sulfobenzoate isomers can be used, provided that not more than about 0.15 mole fraction of the isomers are in para-form. If commercial grades of sulfobenzoyl endcapping reactants are used, the content of unsulfonated material, such as benzoic acid or the like, should not exceed about 0.1 mole fraction of the reactant for best results. Mineral acids such as sulfuric acid or oleum will be removed from the sulfonated reactant before use. Water can be present, e.g., as in crystal hydrates of the sulfobenzoyl end-capping reactant, but will not desirably constitute a large proportion thereof.

Appropriate glycols or cyclic carbonate derivatives thereof can be used to provide the essential oxy-1,2-alkyleneoxy units; thus, 1,2-propylene glycol (preferred especially on grounds of its lower cost) or (where the starting carboxyl groups are present in an acidic form) the cyclic carbonate

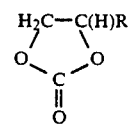 (IV)

R=methyl) are suitable sources of oxy-1,2-alkyleneoxy units for use herein. Oxyethyleneoxy units present in the esters of the invention are most conveniently provided by ethylene glycol, though as an alternative, ethylene carbonate could be used when free carboxylic acid groups are to be esterified.

Terephthalic acid or dimethyl terephthalate are suitable sources of terephthaloyl units. In general, it is preferred herein to use ester, rather than acid, forms of reactants which provide the terephthaloyl units.

When starting with the simplest reactants as illustrated above, the overall synthesis is usually multi-step, involving at least two stages, such as an initial esterification or transesterification (also known as ester interchange) stage, followed by an oligomerization or polymerization stage, in which molecular weights of the esters are increased, but only to a limited extent as provided for by the invention.

Formation of ester-bonds in reaction types 2 and 3 involves elimination of low molecular weight by-products such as water (reaction 2), or simple alcohols (reaction 3). Complete removal of the latter from reaction mixtures is generally somewhat easier than removal of the former. However, since the ester-bond forming reactions are generally reversible, it is necessary to "drive" the reactions forward in both instances, removing these by-products.

In practical terms, in the first stage (ester interchange) the reactants are mixed in appropriate proportions and are heated, to provide a melt, at atmospheric or slightly superatmospheric pressures (preferably of an inert gas such as nitrogen or argon). Water and/or low molecular weight alcohol is liberated and is distilled from the reactor at temperatures up to about 200° C. (A temperature range of from about 150°–200° C. is generally preferred for this stage).

In the second (i.e., oligomerization) stage, vacuum techniques and temperatures somewhat higher than in the first stage are applied; removal of volatile by-products and excess reactants continues, until the reaction is complete, for example as monitored by conventional spectroscopic techniques. Continuously applied vacuum, typically of about 10 mm Hg or lower can be used.

In both of the above-described reaction stages, it is necessary to balance on one hand the desire for rapid and complete reaction (higher temperatures and shorter times preferred), against the need to avoid thermal degradation (which undesirably might result in off-colors and by-products). It is possible to use generally higher reaction temperatures, especially when reactor design minimizes super-heating or "hot spots" and minimizes exposure time. Thus, a suitable temperature for oligomerization lies most preferably in the range of from about 150° C. to about 260° C. (assuming that no special precautions, such as of reactor design, are otherwise taken to limit thermolysis).

It is very important in the above-described procedure to use continuous mixing, so that the reactants are always in good contact; highly preferred procedures involve formation of a well-stirred homogeneous melt of the reactants in the temperature ranges given above. It is also highly preferred to maximize the surface area of reaction mixture which is exposed to vacuum or inert gas to facilitate the removal of volatiles, especially in the oligomerization or polymerization step.

Catalysts and catalyst levels appropriate for esterification, transesterification, oligomerization, and for combinations thereof, are all well-known in polyester chemistry, and will generally be used herein; as noted above, a single catalyst will suffice. Suitably catalytic metals are reported in Chemical Abstracts, CA83:178505v, which states that the catalytic activity of transition metal ions during direct esterification of K and Na carboxybenzenesulfonates by ethylene glycol decreases in the order Sn (best), Ti, Pb, Zn, Mn, Co (worst).

The reactions can be continued over periods of time sufficient to guarantee completion, or various conventional analytical monitoring techniques can be employed to monitor progress of the forward reaction; such monitoring makes it possible to speed up the procedures somewhat, and to stop the reaction as soon as a product having the minimum acceptable composition is formed.

Appropriate monitoring techniques include measurement of relative and intrinsic viscosities, acid values, hydroxyl numbers, $^1H$ and $^{13}C$ nuclear magnetic resonance (n.m.r) spectra, and liquid chromatograms.

Most conveniently, when using a combination of volatile reactants (such as a glycol) and relatively involatile reactants (such as m-sulfobenzoic acid monosodium salt and dimethyl terephthalate), the reaction will be initiated with excess glycol being present. As in the case of ester interchange reactions reported by Odian (op. cit.), "stoichiometric balance is inherently achieved in the last stages of the second step of the process". Excess glycol can be removed from the reaction mixture by distillation; thus, the exact amount used is not critical.

Inasmuch as final stoichiometry of the ester compositions depends on the relative proportions of reactants retained in the reaction mixtures and incorporated into the esters, it is desirable to conduct the condensations in a way which effectively retains the non glycol reactants, and prevents them from distilling or subliming. Dimethyl terephthalate and to a lesser extent the simple glycol esters of terephthalic acid have sufficient volatility to show on occasion "sublimation" to cooler parts of the reaction apparatus. To ensure achieving the desired stoichiometry it is desirable that this sublimate be returned to the reaction mixture, or alternatively, that sublimation losses be compensated by use of a small excess of terephthalate. In general, sublimation-type losses, such as of dimethyl terephthalate, may be minimized 1) by apparatus design; 2) by raising the reaction temperature slowly enough to allow a large proportion of dimethyl terephthalate to be converted to less volatile glycol esters before reaching the upper reaction temperatures; 3) by conducting the early phase of the transesterification under low to moderate pressure (especially effective is a procedure allowing sufficient reaction time to evolve at least about 90% of the theoretical yield of methanol before applying vacuum).

Typically herein, when calculating the relative proportions of reactants to be used, the following routine is followed, as illustrated for a combination of the reactants m-sulfobenzoic acid monosodium salt (A), ethylene glycol (B), propylene glycol ($B^1$) and dimethyl terephthalate (C):

1. the desired degree of end-capping is selected; for the present example, the value 2, most highly preferred according to the invention, is used;
2. the average calculated number of terephthaloyl units in the backbone of the desired ester is selected; for the present example, the value 3.75, which falls in the range of most highly preferred values according to the invention, is used;
3. the mole ratio of (A) to (C) should thus be 2:3.75; amounts of the reactants (A) and (C) are taken accordingly;
4. an appropriate excess of glycols is selected; typically 2 to 15 times the number of moles of dimethyl terephthalate is suitable.

More generally herein, when preparing fully end-capped ester from "simple" reactants, a ratio of the moles of end-capping reactant to moles of other non-glycol organic reactants (e.g., in the simplest case only dimethyl terephthalate) of from about 2:1 to about 1:5, preferably from about 1:1 to about 1:2.5, most preferably about 1:1.25 to about 1:2 will be used. The glycols used will be calculated in an amount, in any event sufficient to allow interconnection of all other units by means of ester bonds, and adding a convenient excess will usually result in a total relative amount of glycol ranging from about 1.5 to about 10 moles for each mole nonglycol organic reactants added together.

Typically the ratio of oxyethyleneoxy: oxy-1,2-propyleneoxy units in the desired esters will be somewhat higher than the ratio of ethylene glycol: 1,2-propylene glycol used (in excess) as starting reactants. Typically, if a final ratio of 4:1 for oxyethyleneoxy to oxy-1,2-propyleneoxy units is desired in the final ester, a starting ratio of approximately 2:1 ethylene glycol to 1,2-propylene glycol is used.

In light of the teaching of the present invention (insofar as the identity and proportions of essential end-capping and backbone units are concerned), numerous syntheses of ester compositions according to the invention follow straightforwardly from the above disclo-

EXAMPLE I

An ester composition made from m-sulfobenzoic acid monosodium salt, 1,2-propylene glycol, ethylene glycol and dimethyl terephthalate.

Into a 1000 ml, three-necked, round bottom flask, fitted with a thermometer, magnetic stirrer and modified Claisen head, the latter connected to a condenser and receiver flask, are placed, under argon, m-sulfobenzoic acid monosodium salt (89.6 g; 0.40 moles; Eastman Kodak), 1,2-propylene glycol (144.6 g; 1.90 moles; Aldrich), ethylene glycol (236.0 g; 3.80 moles; Mallinckrodt), and hydrated monobutyltin(IV) oxide (0.6 g; 0.1% w/w; sold as FASCAT 4100 by M&T Chemicals). Over a five hour period, the mixture is stirred and heated under argon at atmospheric pressure, to reach a temperature of 175° C. The reaction conditions are kept constant for an additional 16 hours, during which time distillate (12.2 g; 164% based on the theoretical yield of water) is collected. The reaction mixture is cooled to about 100° C., and dimethyl terephthalate (145.5 g; 0.75 moles; Union Carbide) is added under argon. Over a 4 hour period, the mixture is stirred and heated under argon at atmospheric pressure, to reach a temperature of 175° C. The reaction conditions are kept approximately constant (temperature range 175°–180° C.) for a further 18 hours, during which time distillate (48.9 g; 102% of theory based on the calculated yield of methanol) is collected. The mixture is cooled to about 50° C. and is transferred under argon to a Kugelrohr apparatus (Aldrich). The apparatus is evacuated to a pressure of 1 mm Hg. While maintaining the vacuum and stirring, the temperature is gradually raised to 220° C. over about 1 hour. Reaction conditions are then held constant for about 6 hours to allow completion of the synthesis. During this period, excess glycol distills from the homogeneous mixture. At the end of the condensation, the reaction vessel is removed from the heat and cooled promptly to obtain the ester in the desired, glassy, amorphous state.

Using the convention introduced above, the product of Example III has the empirical formula representation:

$(CAP)_2(EG/PG)_{4.75}(T)_{3.75}$

In this representation, (CAP) represents the m-sulfobenzoyl end-capping units, in sodium salt form. The mole ratio of oxyethyleneoxy and oxy-1,2-propyleneoxy units is determined spectroscopically to be about 4:1; the volatility and reactivity differentials of the parent glycols are responsible for the difference between this observed ratio and the ratio of moles of the two glycols used as reactants.

Illustrative of structures of oligomeric ester molecules present in the composition of Example I is:

(CAP)—(EG)—(T)—(PG)—(T)—(EG)—(T)—(EG)—(T)—(EG)—(CAP).

In the above Example I, when 1.20 moles of 1,2-propylene glycol and 4.80 moles of ethylene glycol are added to the flask (instead of 1.90 and 3.80 moles, respectively), an ester composition of the invention having the empirical formula representation $(CAP)_2(EG/PG)_{4.75}(T)_{3.75}$ is obtained, with the mole ratio of oxyethyleneoxy units to oxy-1,2-propyleneoxy units being approximately equal to 8.

In the above Example I, when 0.60 moles of dimethyl terephthalate is added to the flask (instead of 0.75 moles), an ester composition of the invention having the empirical formula representation $(CAP)_2(EG/PG)_4 (T)_3$ is obtained.

EXAMPLES II–IV

Ester compositions made from simple reactants capable of providing sulfobenzyl end-capping units having different isomeric forms and chemical compositions, using ethylene glycol, 1,2-propylene glycol and dimethyl terephthalate as co-reactants. The examples also include illustration of the use of cations other than sodium associated with the sulfonate anion, and simulate incompletely sulfonated end-capping reactant.

The procedure of Example I is in each instance reproduced, with the single exception that the m-sulfobenzoic acid monosodium salt (89.6 g; 0.40 moles) used in Example I is replaced with an equimolar amount of the following:

| Example II | 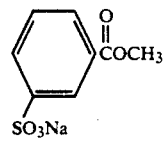 |
|---|---|
| Example III | a mixture, having the following composition (weight %): m-sulfobenzoic acid monosodium salt, 92%; p-sulfobenzoic acid monopotassium salt (Eastman Kodak), 6%; o-sulfobenzoic acid monosodium salt, 2%. |
| Example IV | a mixture having the following composition (weight %): m-sulfobenzoic acid monosodium salt, 92%; para-sulfobenzoic acid monopotassium salt (Eastman Kodak), 6%; o-sulfobenzoic acid monosodium salt, 1%; benzoic acid (Aldrich). 1%. |

EXAMPLE V

An ester composition is made from m-sulfobenzoic acid monosodium salt, ethylene glycol, 1,2-propylene glycol and dimethyl terephthalate. The example illustrates an ester composition according to the invention which is prepared by a procedure identical with that of Example I, with the single exception that a different catalyst is used.

The procedure of Example I is repeated, with the single exception that $Sb_2O_3$ (0.6 g; 0.002 moles; Fisher) and calcium acetate monohydrate (0.6 g; 0.003 moles, MCB) are used as replacement for the tin catalyst of Example 1. The product of this example has a slightly darker color, but is otherwise similar to that prepared by the unchanged Example I procedure.

Use of Esters of the Invention as Soil-Release Agents

Esters of the invention are especially useful as soil release agents in granular laundry detergent compositions, which can be fully formulated compositions intended for use in the main laundering operation, or laundry additive or pretreatment compositions comprising the essential ester compositions and optional ingredients. The ester compositions, as provided herein, will typically constitute from about 0.1% to about 10% by weight of a granular detergent. See the following patents, all incorporated herein by reference, for detailed illustrations of granular detergent compositions suitable for use in combination with the soil release esters herein; these patents include disclosures of types and levels of typical detersive surfactants and builders: U.S. Pat. Nos. 3,985,669, Krummel et al., issued Oct. 12, 1976; 4,379,080, Murphy, issued Apr. 5, 1983; 4,490,271, Spadini et al., issued Dec. 25, 1984 and 4,605,509, Corkill et al., issued Aug. 12, 1986 (in the foregoing, granular detergent compositions have non-phosphorus builder systems; other non-phosphorus builders usable herein are the compounds tartrate monosuccinate/tartrate disuccinate, disclosed in U.S. Pat. No. 4,663,071, Bush et al., issued May 5, 1987 and 2,2'-oxodisuccinate, disclosed in U.S. Pat. No. 3,128,287, Berg, issued Apr. 7, 1964). Phosphorus-containing builders well-known in the art can also be used, as can bleaches; see U.S. Pat. No. 4,412,934, Chung et al., issued Nov. 1, 1983.

Ester compositions of the invention, at aqueous concentrations ranging from about 1 to about 50 ppm, more preferably about 5 to about 30 ppm, provide effective, combined cleaning and soil release treatments for polyester fabrics washed in an aqueous, preferably alkaline (pH range about 7 to about 11, more preferably about 8 to about 10) environment, in the presence of typical granular detergent ingredients; including anionic surfactants, phosphate, ether carboxylate or zeolite builders, and various commonly used ingredients such as bleaches, enzymes and optical brighteners. Surprisingly (especially insofar as pH and anionic surfactant are concerned), all of these detergent ingredients can be present in the wash water at their art-disclosed levels, to perform their conventional tasks, e.g., for cleaning and bleaching fabrics or the like, without ill-effects on the soil release properties of the esters.

Useful anionic surfactants in the compositions herein include the water-soluble salts of the higher fatty acids, i.e., "soaps". This includes alkali metal soaps such as the sodium, potassium, ammonium, and alkylolammonium salts of higher fatty acids containing from about 8 to about 24 carbon atoms, and preferably from about 12 to about 18 carbon atoms. Soaps can be made by direct saponification of fats and oils or by the neutralization of free fatty acids. Particularly useful are the sodium and potassium salts of the mixtures of fatty acids derived from coconut oil and tallow, i.e., sodium or potassium tallow and coconut soap.

Useful anionic surfactants also include the water-soluble salts, preferably the alkali metal, ammonium and alkylolammonium salts, of organic sulfuric reaction products having in their molecular structure an alkyl group containing from about 10 to about 20 carbon atoms and a sulfonic acid or sulfuric acid ester group. (Included in the term "alkyl" is the alky portion of acyl groups). Examples of this group of synthetic surfactants are the sodium and potassium alkyl sulfates, especially those obtained by sulfating the higher alcohols ($C_8$–$C_{18}$ carbon atoms) such as those produced by reducing the glycerides of tallow or coconut oil; and the sodium and potassium alkylbenzene sulfonates in which the alkyl group contains from about 9 to about 15 carbon atoms, in straight chain or branched chain configuration, e.g., those of the type described in U.S. Pat. Nos. 2,220,099, and 2,477,383. Especially valuable are linear straight chain alkylbenzene sulfonates in which the average number of carbon atoms in the alkyl group is from about 11 to 13, abbreviated as $C_{11-13}$ LAS.

Other anionic surfactants herein are the sodium alkyl glyceryl ether sulfonates, especially those ethers of higher alcohols derived from tallow and coconut oil; sodium coconut oil fatty acid monoglyceride sulfonates and sulfates; sodium or potassium salts of alkyl phenol ethylene oxide ether sulfates containing from about 1 to about 10 units of ethylene oxide per molecule and wherein the alkyl groups contain from about 8 to about 12 carbon atoms; and sodium potassium salts of alkyl ethylene oxide ether sulfates containing about 1 to about 10 units of ethylene oxide per molecule and wherein the alkyl group contains from about 10 to about 20 carbon atoms.

Other useful anionic surfactants herein include the water-soluble salts of esters of alpha-sulfonated fatty acids containing from about 6 to 20 carbon atoms in the fatty acid group and from about 1 to 10 carbon atoms in the ester group; water-soluble salts of 2-acyloxyalkane-1-sulfonic acids containing from about 2 to 9 carbon atoms in the acyl group and from about 9 to about 23 carbon atoms in the alkane moiety; water-soluble salts of olefin and paraffin sulfonates containing from about 12 to 20 carbon atoms; and beta-alkyloxy alkane sulfonates containing from about 1 to 3 carbon atoms in the alkyl group and from about 8 to 20 carbon atoms in the alkane moiety.

Preferred anionic surfactants are selected from the group consisting of $C_{11}$–$C_{13}$ linear alkylbenzene sulfonates, $C_{10}$–$C_{18}$ alkyl sulfates, and $C_{10}$–$C_{18}$ alkyl sulfates ethoxylated with an average of from about 1 to about 6 moles of ethylene oxide per mole of alkyl sulfate, and mixtures thereof.

Water-soluble nonionic surfactants are also useful in the compositions of the invention. Such nonionic materials include compounds produced by the condensation of alkylene oxide groups (hydrophilic in nature) with an organic hydrophobic compound, which may be aliphatic or alkyl aromatic in nature. The length of the polyoxyalkylene group which is condensed with any particular hydrophobic group can be readily adjusted to yield a water-soluble compound having the desired degree of balance between hydrophilic and hydrophobic elements.

Suitable nonionic surfactants include the polyethylene oxide condensates of alkyl phenols, e.g., the condensation products of alkyl phenols having an alkyl group containing from about 6 to 15 carbon atoms, in either a straight chain or branched chain configuration, with from about 3 to 12 moles of ethylene oxide per mole of alkyl phenol.

Preferred nonionic surfactants are the water-soluble and water-dispersible condensation products of aliphatic alcohols containing from 8 to 22 carbon atoms, in either straight chain or branched configuration, with from 3 to 12 moles of ethylene oxide per mole of alcohol. Particularly preferred are the condensation products of alcohols having an alkyl group containing from about 9 to 15 carbon atoms with from about 4 to 8 moles of ethylene oxide per mole of alcohol.

The granular detergent compositions herein generally comprise from about 5% to about 80%, preferably from about 10% to about 60%, more preferably from about 15% to about 50%, by weight of detergent surfactant.

Nonlimiting examples of suitable water-soluble, inorganic detergent builders useful herein include: alkali metal carbonates, borates, phosphates, bicarbonates and silicates. Specific examples of such salts include sodium and potassium tetraborates, bicarbonates, carbonates, orthophosphates, pyrophosphates, tripolyphosphates and metaphosphates.

Examples of suitable organic alkaline detergency builders include: (1) water-soluble amino carboxylates and aminopolyacetates, for example, nitrilotriacetates, glycinates, ethylenediaminetetraacetates, N-(2-hydroxyethyl)nitrilo diacetates and diethylenetriamine pentaacetates; (2) water-soluble salts of phytic acid, for example, sodium and potassium phytates; (3) water-soluble polyphosphonates, including sodium, potassium, and lithium salts of ethane-1-hydroxy-1, 1-diphosphonic acid; sodium, potassium, and lithium salts of ethylene diphosphonic acid; and the like; (4) water-soluble polycarboxylates such as the salts of lactic acid, succinic acid, malonic acid, maleic acid, citric acid, oxydisuccinic acid, carboxymethyloxysuccinic acid, 2-oxa-1,1,3-propane tricarboxylic acid, 1,1,2,2-ethane tetracarboxylic acid, mellitic acid and pyromellitic acid; (5) water-soluble polyacetals as disclosed in U.S. Pat. Nos. 4,144,266 and 4,246,495 incorporated herein by reference; and (6) the water-soluble tartrate monosuccinates and disuccinates, and mixtures thereof, disclosed in U.S. Pat. No. 4,663,071 Bush et al, issued May 5, 1987, incorporated herein by reference.

Another type of detergency builder material useful in the final granular detergent product comprises a water-soluble material capable of forming a water-insoluble reaction product with water hardness cations preferably in combination with a crystallization seed which is capable of providing growth sites for said reaction product. Such "seeded builder" compositions are fully disclosed in British Patent No. 1,424,406.

A further class of detergency builder materials useful in the present invention are insoluble sodium aluminosilicates, particularly those described in Belgian Patent No. 814,874, issued Nov. 12, 1974, as having the formula:

$$Na_z\text{—}(AlO_2)\text{—}(SiO_2)_y\cdot XH_2O$$

wherein z and y are integers equal to at least 6, the molar ratio of z to y is in the range of from 1.0:1 to about 0.5:1, and X is an integer from about 15 to about 264, said aluminosilicates having a calcium ion exchange capacity of at least 200 milligrams equivalent/gram and a calcium ion exchange rate of at least about 2 grain/gallon/minute/gram. A preferred material is Zeolite A which is:

$$Na_{12}\text{—}(SiO_2AlO_2)_{12}\cdot 27H_2O.$$

Preferably, the builder comprises a tripolyphosphate, pyrophosphate, carbonate, polycarboxylate, or aluminosilicate detergency builder, or mixtures thereof.

The detergency builder component generally comprises from about 10% to 90%, preferably from about 15% to 75%, more preferably from about 20% to 60%, by weight of the spray-dried detergent composition.

Optional components which can be included in the granular detergents herein are materials such as cationic surfactants, softening agents, enzymes (e.g., proteases and amylases), bleaches and bleach activators, other soil release agents (such as disclosed in U.S. Pat. Nos. 4,702,857, Gosselink, issued Oct. 27, 1987, and 4,721,580, Gosselink, issued Jan. 26, 1988, incorporated herein by reference), soil suspending agents, fabric brighteners, enzyme stabilizing agents, color speckles, suds boosters or suds suppressors, anticorrosion agents, dyes, fillers, germicides, pH adjusting agents, non-builder alkalinity sources, and the like. Materials listed above which are heat sensitive or degraded by other materials in the crutcher mix slurry are generally admixed with the spray-dried portion of the finished granular detergent composition.

Certain granular detergent compositions of the present invention preferably also contain a peroxyacid bleach, which in conjunction with the soil release esters herein provides unexpectedly superior cleaning performance, particularly of oily soils from polyester fabrics.

The peroxyacid and the soil release esters herein are preferably present at a weight ratio of available oxygen provided by the peroxyacid to soil release esters of from about 4:1 to about 1:30, more preferably from about 2:1 to about 1:15, and most preferably from about 1:1 to about 1:7.5. The combination can be incorporated into a fully formulated, stand alone product, or it can be formulated as an additive to be used in combination with a laundry detergent.

The peroxyacid can be a preformed peroxyacid, or a combination of an inorganic persalt (e.g., sodium perborate), and an organic peroxyacid precursor which is converted to a peroxyacid when the combination of persalt and precursor is dissolved in water. The organic peroxyacid precursors are often referred to in the art as bleach activators.

Examples of suitable organic peroxyacids are disclosed in U.S. Pat. Nos. 4,374,035, Bossu, issued Feb. 15, 1983; 4,681,592, Hardy et al, issued Jul. 21, 1987; 4,634,551, Burns et al, issued Jan. 6, 1987; 4,686,063, Burns, issued Aug. 11, 1987; 4,606,838, Burns, issued Aug. 19, 1986; and 4,671,891, Hartman, issued Jun. 9, 1987. Examples of compositions suitable for laundry bleaching which contain perborate bleaches and activators therefor are disclosed in U.S. Pat. Nos. 4,412,934, Chung and Spadini, issued Nov. 1, 1983; 4,536,314, Hardy et al, issued Aug. 20, 1985; 4,681,695, Divo, issued Jul. 21, 1987; and 4,539,130, Thompson et al, issued Sep. 3, 1985. All of the above patents are incorporated herein by reference.

The preferred organic peroxyacid is selected from the following:

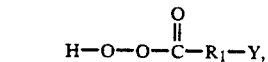

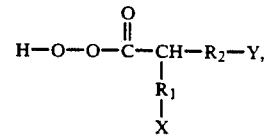

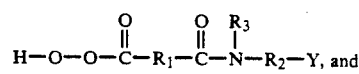

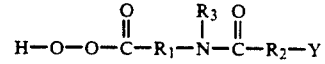

wherein $R_1$ and $R_2$ are alkylene groups containing from 1 to about 20 carbon atoms or phenylene groups, $R_3$ is hydrogen or an alkyl, aryl, or alkaryl group containing from about 1 to about 10 carbon atoms, and X and Y are hydrogen, halogen, alkyl (e.g., methyl, isopropyl), aryl, or any group which provides an anionic moiety in aqueous solution. Such X and Y groups can include, for example,

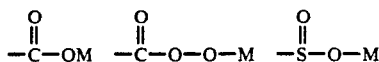

where M is hydrogen or a water-soluble salt-forming cation. Mixtures of such peroxyacids can also be used herein.

Specific examples of preferred peroxyacids for this invention include diperoxydodecanedioic acid (DPDA), nonylamide of peroxysuccinic acid (NAPSA), nonylamide of peroxyadipic acid (NAPAA) and decyldiperoxysuccinic acid (DDPSA). For the purpose of this invention, the peroxyacid is preferably incorporated into a soluble granule according to the method described in the above cited U.S. Pat. No. 4,374,035. A preferred bleach granule comprises, by weight, 1% to 50% of an exotherm control agent (e.g., boric acid); 1% to 25% of a peroxyacid compatible surfactant (e.g., $C_{13}LAS$); 0.1% to 10% of one or more chelant stabilizers (e.g., sodium pyrophosphates); and 10% to 70% of a water-soluble processing salt (e.g., $Na_2SO_4$).

The peroxyacid bleach is used at a level which provides an amount of available oxygen (AvO) from about 0.1% to about 10%, preferably from about 0.5% to about 5%, and most preferably from about 1% to about 4%, all by weight of the composition.

Effective amounts of peroxyacid bleach per unit dose of the composition of this invention used in typical laundry liquor, e.g., containing 64 liters of 16°-60° C. water, provide from about 1 ppm to about 150 ppm of available oxygen (AvO), more preferably from about 2 ppm to about 20 ppm. The laundry liquor should also have a pH of from 7 to 11, preferably 8 to 10, for effective peroxyacid bleaching. See Col. 6, lines 1-10, of U.S. Pat. No. 4,374,035.

Alternatively, the composition may contain a suitable organic precursor which generates one of the above peroxyacids when reacted with alkaline hydrogen peroxide in aqueous solution. The source of hydrogen peroxide can be any inorganic peroxygen compound which dissolves in aqueous solution to generate hydrogen peroxide, e.g., sodium perborate (monohydrate and tetrahydrate) and sodium percarbonate. These compositions comprise:

(a) a peroxygen bleaching compound capable of yielding hydrogen peroxide in an aqueous solution; and
(b) a bleach activator having the general formula:

wherein R is an alkyl group containing from about 5 to about 18 carbon atoms wherein the longest linear alkyl chain extending from and including the carbonyl carbon contains from about 6 to about 10 carbon atoms and L is a leaving group, the conjugate acid of which has a $pK_a$ in the range of from about 6 to about 13. wherein the molar ratio of hydrogen peroxide yielded by (a) to bleach activator (b) is greater than about 1.5.

The level of peroxygen bleach within compositions of the invention is from about 0.1% to about 95% and preferably from about 1% to about 60%. When the bleaching compositions within the invention are also fully formulated detergent compositions, it is preferred that the level of peroxygen bleach is from about 1% to about 20%.

Especially preferred bleach activators are those of the above general formula wherein R is a linear alkyl chain containing from about 5 to about 9 and preferably from about 6 to about 8 carbon atoms and L is selected from the group consisting of:

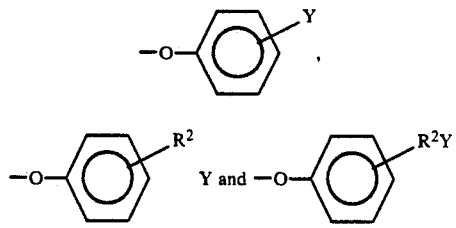

wherein $R^2$ is as defined above and Y is $-SO_3M^+$ or $-COO-M^+$ wherein M is as defined above.

The most preferred bleach activators have the formula:

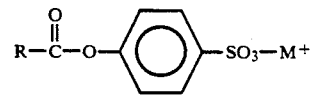

wherein R is a linear alkyl chain containing from about 5 to about 9 and preferably from about 6 to about 8 carbon atoms and M is sodium or potassium.

The level of bleach activator within the compositions of the invention is from about 0.1% to about 60% and preferably from about 0.5% to about 40%. When the bleaching compositions within the invention are also fully formulated detergent compositions, it is preferred that the level of bleach activator is from about 0.5% to about 20%.

Preferred compositions comprise an effective amount of soil release agent and peroxyacid bleach precursor and peroxygen compound to work in the wash solution. The weight ratio of available oxygen, provided by the peroxygen compound, to soil release agent is preferably 12:1 to 1:10; more preferably 6:1 to 1:5; and most preferably 3:1 to 1:2.5.

The invention encompasses a method of laundering fabrics and concurrently providing a soil release finish thereto. The method simply comprises contacting said fabrics with an aqueous laundry liquor containing the conventional detersive ingredients described hereinabove, as well as the above-disclosed effective levels of a soil release agent (namely, from about 1 to 50 ppm of an oligomeric or polymeric composition comprising at least 20% by weight of an ester of the invention). Although this method is not especially limited in terms of factors such as pH and surfactant types present, it should be appreciated that for best cleaning of fabrics, it is often especially desirable to make use, in the laundry process, of anionic surfactants, such as conventional linear alkylbenzene sulfonates, and also to use higher pH ranges as defined above. Use of these surfactants and pH ranges surprisingly does not prevent the esters of the invention from acting effectively as soil release agents. Thus, a preferred method, for an optimized combination of cleaning and soil-release finishing, provided by the invention, constitutes using all of the following:

the preferred levels of soil release agent (5–30 ppm); anionic surfactant;

pH of from about 7 to about 11; and, by way of soil release agent, a preferred ester composition of the invention, such as the oligomeric product of reacting compounds comprising sulfobenzoic acid or a $C_1$–$C_4$ alkyl carboxylate ester thereof as the monosodium salt, dimethyl terephthalate, ethylene glycol and 1,2-propylene glycol (see, for example the methods for making and examples, such as Example I, hereinabove for further details). In the preferred method, polyester fabrics are used; best soil-release results are achieved thereon, but other fabric types can also be present.

The simultaneous cleaning and soil-release benefits of the present invention are surprisingly obtainable after as little treatment as a single laundry/use cycle, particularly on polyester fabrics. Best results on polycotton fabrics generally are obtained using three or more cycles. As used herein, a laundry/use cycle generally comprises the ordered sequence of steps:

a) contacting said fabrics with said aqueous laundry liquor in a conventional automatic washing machine for periods ranging from about 5 minutes to about 1 hour;

b) rinsing said fabrics with water;

c) line- or tumble-drying said fabrics; and d) exposing said fabrics to soiling through normal wear or domestic use.

In the above, hand-washing provides an effective but less preferred variant in step (a), wherein U.S. or European washing machines operating under their conventional conditions of time, temperature, fabric load, amounts of water and laundry product concentrations will give the best results. Also, in step (c), the "tumble-drying" to which is referred especially involves use of conventional domestic brands of programmable laundry dryers (these are occasionally integral with the washing machine), also using their conventional fabric loads, temperatures and operating times.

The following nonlimiting examples illustrate the use of a typical ester composition of the invention (that of Example I) as a soil release agent for thru-the-wash application to polyester fabrics.

EXAMPLES VI–VIII

Granular detergent compositions comprise the following ingredients:

| Ingredient | Percent (Wt) | | |
|---|---|---|---|
| | VI | VII | VIII |
| Sodium $C_{11}$–$C_{13}$ alkyl benzene sulfonate | 7.5 | 4.0 | 12.0 |
| $C_{12}$–$C_{13}$ alcohol ethoxylate (EO 6.5) | 1.0 | 0.0 | 1.0 |
| Sodium tallow alcohol sulfate | 7.5 | 6.5 | 7.5 |
| Sodium tripolyphosphate | 25.0 | 39.0 | 0.0 |
| Sodium pyrophosphate | 6.0 | 0.0 | 0.0 |
| Zeolite A, hydrate (1–10 micron size) | 0.0 | 0.0 | 29.0 |
| Sodium carbonate | 17.0 | 12.0 | 17.0 |
| Sodium silicate (1:6 ratio NaO/SiO$_2$) | 5.0 | 6.0 | 2.0 |
| Balance (can, for example, include water, soil dispersant, bleach, optical brightener, | | to 98.0 | |

| Ingredient | Percent (Wt) | | |
|---|---|---|---|
| | VI | VII | VIII |
| perfume, suds suppressor or the like) | | | |

Aqueous crutcher mixes of the detergent compositions are prepared and spray-dried, so that they contain the ingredients tabulated, at the levels shown. The ester composition of Example I is ground to a particle size distribution to match that of the granular detergent product, which typically is from about 400 to 1000 microns to minimize physical segregation. Particle sizes in this range are also preferred over smaller particle sizes which have a greater surface area to mass ratio, and thus are more susceptible to moisture-induced crystallization. The ester composition is admixed in an amount sufficient for use at a level of 2% by weight in conjunction with the detergent compositions.

The detergent granules and ester composition are added (98 parts/2 parts by weight, respectively), together with a 6 lb. load of previously laundered and soiled fabrics (load composition: 20 wt. % polyester fabrics/80 wt. % cotton fabrics), to a Sears KENMORE washing machine. Actual weights of detergent and ester compositions are taken to provide a 1280 ppm concentration of the former and 30 ppm concentration of the latter in the 17 l waterfill machine. The water used has 7 grains/gallon hardness and a pH of 7 to 7.5 prior to (about 9 to about 10.5 after) addition of the detergent and ester compositions.

The fabrics are laundered at 35° C. (95° F.) for a full cycle (12 min.) and rinsed at 21° C. (70° F.). The fabrics are then line dried and are exposed to a variety of soils (by wear or controlled application). The entire cycle of laundering and soiling is repeated several times for each of the detergent compositions, with separate fabric bundles reserved for use with each of the detergent compositions. Excellent results are obtained in all cases (VI–VIII), especially in that polyester or polyester-containing fabrics laundered one or several times as described, display significantly improved removal of soils (especially oleophilic types) during laundering compared with fabrics which have not been exposed to the esters of the invention.

EXAMPLES IX–XII

Granular detergent compositions comprise the following ingredients:

| Ingredient | Percent (Wt) | | | |
|---|---|---|---|---|
| | IX | X | XI | XII |
| Sodium 12.3 linear alkyl benzene sulfonate | 3.6 | 9.4 | 12.0 | 9.0 |
| Sodium $C_{14}$–$C_{16}$ alkyl sulfate | 5.7 | 9.4 | 5.4 | 3.9 |
| Sodium tallow alcohol sulfate | 5.7 | 0.0 | 0.0 | 0.0 |
| $C_{12}$–$C_{13}$ alcohol ethoxylate (EO 6.5) | 1.0 | 1.4 | 0.9 | 0.4 |
| Sodium tripolyphosphate | 6.2 | 0.0 | 0.0 | 4.6 |
| Sodium pyrophosphate | 24.8 | 0.0 | 0.0 | 17.2 |
| Zeolite A, hydrate (1–10 micron size) | 0.0 | 26.7 | 17.9 | 0.0 |
| Sodium carbonate | 17.0 | 14.5 | 22.7 | 22.0 |
| Sodium silicate (1.6 ratio NaO/SiO$_2$) | 3.7 | 2.7 | 3.0 | 7.2 |
| Polyethylene glycol 8000 | 0.5 | 1.0 | 1.2 | 0.3 |
| Sodium polyacrylate (MW 4500) | 1.2 | 2.9 | 1.7 | 1.0 |
| Protease enzyme* | 0.35 | 0.47 | 0.45 | 0.37 |
| Sodium perborate monohydrate | 0.0 | 0.0 | 4.5 | 3.7 |
| Nonanoyloxybenzene sulfonate | 0.0 | 0.0 | 5.1 | 5.3 |

-continued

| Ingredient | Percent (Wt) | | | |
|---|---|---|---|---|
| | IX | X | XI | XII |
| Sodium diethylenetriamine pentaacetate | 0.0 | 0.0 | 0.4 | 0.4 |
| Sodium sulfate | 29.5 | 13.5 | 16.4 | 21.1 |
| Soil release ester of Ex. I | 1.1 | 1.0 | 0.9 | 0.8 |
| Balance (including water, brightener, perfume, suds suppressor) | to 100.0 | | | |

*Reported in Anson units per gram.

Aqueous crutcher mixes of the detergent compositions are prepared and spray-dried, except for the enzyme, bleach, perfume, and soil release ester which are admixed, so that they contain the ingredients tabulated, at the levels shown.

The detergent composition is added, together with a 6 lb. load of previously laundered and soiled fabrics (load composition: 20 wt. % polyester fabrics/80 wt. % cotton fabrics), to a Sears KENMORE washing machine. Actual weights of detergent compositions are taken to provide a concentration of 1322 ppm for Composition IX, 1467 ppm for Composition X, and 1718 for Composition XI and XII, in the 17 l water-fill machine. The water used has 7 grains/gallon hardness and a pH of 7 to 7.5 prior to (about 9 to about 10.5 after) addition of the detergent and ester compositions.

The fabrics are laundered at 35° C. (95° F.) for a full cycle (12 min.) and rinsed at 21° C. (70° F.). The fabrics are then dried and are exposed to a variety of soils (by wear or controlled application). The entire cycle of laundering and soiling is repeated several times for each of the detergent compositions, with separate fabric bundles reserved for use with each of the detergent compositions. Excellent results are obtained in all cases (IX-XII), especially in that polyester or polyester-containing fabrics laundered one or several times as described, display significantly improved removal of soils (especially oleophilic types) during laundering compared with fabrics which have not been exposed to the esters of the invention.

What is claimed is:

1. A granular detergent composition comprising, by weight:
    (a) from about 5% to about 80% of detergent surfactant; and
    (b) from about 0.1% to about 10% of an oligomeric or polymeric composition comprising a substantially linear, sulfobenzoyl end-capped ester; said ester comprising, per mole of said ester:
        (i) from about 1 to about 2 moles of sulfobenzoyl endcapping units of the formula $(MO_3S)(C_6H_4)C(O)$— wherein M is sodium;
        (ii) from about 2 to about 10 moles of oxyethyleneoxy units and oxy-1,2-propyleneoxy units in a mole ratio of oxyethyleneoxy units to oxy-1,2-propyleneoxy units of from about 2.5:1 to about 15:1; and
        (iii) from about 1 to about 9 moles of terephthaloyl units;
    wherein the mole ratio of said oxyalkyleneoxy units to said terephthaloyl units is from about 2:1 to about 1.1:1; and wherein said ester is at least about 90% by weight amorphous in form and access of free water to the ester is limited to maintain the amorphous form.

2. A granular detergent composition according to claim 1 comprising from about 10% to about 60% of an anionic surfactant.

3. A granular detergent composition according to claim 2 wherein the anionic surfactant is selected from the group consisting of $C_{11}$–$C_{13}$ linear alkylbenzene sulfonates, $C_{10}$–$C_{18}$ alkyl sulfates, and $C_{10}$–$C_{18}$ alkyl sulfates ethoxylated with an average of from about 1 to about 6 moles of ethylene oxide per mole of alkyl sulfate, and mixtures thereof.

4. A granular detergent composition according to claim 1 further comprising from about 10% to about 90% of a detergent builder.

5. A granular detergent composition according to claim 4 wherein the detergent builder is a tripolyphosphate, pyrophosphate, carbonate, polycarboxylate, or aluminosilicate detergency builder, or mixtures thereof.

6. A granular detergent composition according to claim 5 comprising from about 20% to about 60% of the detergent builder and from about 15% to about 50% of an anionic surfactant selected from the group consisting of $C_{11}$–$C_{13}$ linear alkylbenzene sulfonates, $C_{10}$–$C_{18}$ alkyl sulfates, and $C_{10}$–$C_{18}$ alkyl sulfates ethoxylated with an average of from about 1 to about 6 moles of ethylene oxide per mole of alkyl sulfate, and mixtures thereof.

7. A granular detergent composition according to claim 4 wherein the oligomeric or polymeric composition comprises from about 25% to about 100% by weight of ester having the empirical formula $(CAP)_x(EG/PG)_y(T)_z$; wherein (CAP) represents the sodium salt form of said sulfobenzoyl end-capping units i); (EG/PG) represents said oxyethyleneoxy and oxy-1,2-propyleneoxy units ii); (T) represents said terephthaloyl units iii); x is from about 1 to 2; y is from about 2.25 to about 7; z is from about 1.25 to about 6; wherein x, y and z represent the average number of moles of the corresponding units per mole of said ester.

8. A granular detergent composition according to claim 7 wherein, the oligomeric or polymeric composition comprises from about 25% to about 100% by weight of ester having the empirical formula $(CAP)_x(EG/PG)_y(T)_z$; wherein (CAP) represents the sodium salt form of said sulfobenzoyl end-capping units i); (EG/PG) represents said oxyethyleneoxy and oxy-1,2-propyleneoxy units ii); (T) represents said terephthaloyl units iii); x is from about 1 to 2; y is from about 2.25 to about 7; z is from about 1.25 to about 6; wherein x, y and z represent the average number of moles of the corresponding units per mole of said ester.

9. A granular detergent composition according to claim 8 comprising from about 20% to about 60% of the detergent builder and from about 15% to about 50% of an anionic surfactant selected from the group consisting of $C_{11}$–$C_{13}$ linear alkylbenzene sulfonates, $C_{10}$–$C_{18}$ alkyl sulfates, and $C_{10}$–$C_{18}$ alkyl sulfates ethoxylated with an average of from about 1 to about 6 moles of ethylene oxide per mole of alkyl sulfate, and mixtures thereof.

10. A granular detergent composition according to claim 9 wherein the detergent builder is a tripolyphosphate, pyrophosphate, carbonate, polycarboxylate, or aluminosilicate detergency builder, or mixtures thereof.

11. A granular detergent composition according to claim 1 which is formulated to provide a solution pH of from about 8 to about 10.

12. A method of laundering fabrics and concurrently providing a soil release finish thereto, comprising contacting said fabrics with an aqueous laundry liquor containing conventional detersive ingredients and providing to the laundering liquor from about 1 to about 50 ppm of a soil release agent in substantially amorphous form which is an oligomeric or polymeric composition comprising a substantially linear, sulfobenzoyl end-capped ester; said ester comprising, per mole of said ester:
  i) from about 1 to about 2 moles of sulfobenzoyl endcapping units of the formula $(MO_3S)(C_6H_4)C(O)-$ wherein M is sodium;
  ii) from about 2 to about 10 moles of oxyethyleneoxy units and oxy-1,2-propyleneoxy units in a mole ratio of oxyethyleneoxy units to oxy-1,2-propyleneoxy units of from about 2.5:1 to about 15:1; and
  iii) from about 1 to about 9 moles of terephthaloyl units;

wherein the mole ratio of said oxyalkyleneoxy units to said terephthaloyl units is from about 2:1 to about 1.1:1 and wherein said ester is at least about 90% by weight amorphous in form.

13. A method according to claim 12, wherein said conventional detersive ingredients comprise one or more conventional anionic surfactants; said soil release agent is present at a level of from about 5 to about 30 ppm in said aqueous laundry liquor; and said aqueous laundry liquor is further characterized in that it has a pH from about 7 to about 11.

14. A method according to claim 13, wherein said fabrics are subjected to two or more cycles comprising the ordered sequence of
  a) contacting said fabrics with said aqueous laundry liquor in a conventional automatic washing-machine for periods ranging from about 5 minutes to about 1 hour;
  b) rinsing said fabrics with water;
  c) line- or tumble-drying said fabrics; and
  d) exposing said fabrics to soiling through normal wear or domestic use.

* * * * *